Patented June 5, 1951

2,555,383

UNITED STATES PATENT OFFICE 2,555,383

PROCESS FOR THE PREPARATION OF CHLORIN E

Monroe E. Wall, Oreland, Pa., assignor to the United States of America as represented by the Secretary of Agriculture No Drawing. Application August 12, 1949, Serial No. 110,019

1 Claim. (Cl. 260—314)

(Granted under the act of March 3, 1883, as amended April 30, 1928; 370 O. G. 757)

This application is made under the act of March 3, 1883, as amended by the act of April 30, 1928, and the invention herein described, if patented in any country, may be manufactured and used by or for the Government of the United States of America for governmental purposes throughout the world without the payment to me of any royalty thereon.

This invention relates to a process for the preparation of chlorin e from chlorophyll-bearing plant materials. Chlorin e is a derivative of chlorophyll and is useful as a dyestuff and as a pharmaceutical.

In general, according to the invention, an alkali isochlorophyllin is reacted with an acid to form chlorin e.

A water-miscible solvent (preferably a methanol) solution of the alkali isochlorophyllin is first prepared. This is accomplished by extracting a chlorophyll-bearing plant material, preferably a dry leaf meal, with an organic chlorophyll solvent, such as acetone, lower alcohols, particularly methanol and ethanol, benzene trichloroethylene, chloroform, and so forth, the leaf meal being first extracted with a fat solvent, such as the aliphatic hydrocarbons or mixtures thereof such as those present in lower boiling petroleum fractions and petroleum ethers, if the meal contains substantial fats. The solvent is removed from the extract thus obtained by evaporating it to dryness and the residue, rich in chlorophyll, is saponified by heating with an alkali dissolved in the water-miscible organic solvent, lower alkanols, particularly methanol, being preferred. The best results are obtained if the saponification is effected by means of a 20 percent solution of potassium hydroxide in substantially anhydrous methanol, and the mixture is boiled under reflux. However, other water-miscible solvents, such as ethanol, may also be used, and sodium hydroxide or other alkanol-soluble alkalis can be utilized in place of potassium hydroxide. The concentration of alkali in the alkanol and the temperature of reaction may be varied within wide limits, but saponification is effected more rapidly by using an alkali solution of about 10–20 percent concentration and conducting the reaction at an elevated temperature. It is desirable to use substantially anhydrous or strong alkanol, that is, at least about 95 percent alkanol, since under these conditions the materials treated are more readily dissolved. This saponification converts the chlorophyll into the corresponding alkali isochlorophyllin, resulting in the alkanol solution of alkali isochlorophyllin above mentioned. The reaction mixture is then preferably diluted with approximately an equal volume of water.

At this stage of the process, the diluted alkanol solution of alkali isochlorophyllin may be optionally extracted with hexane or other fat solvent to remove the unsaponifiable constituents.

The diluted solution is then made slightly acid by addition of the necessary amount of any mineral or organic acid such as sulfuric, hydrochloric, phosphoric, formic or acetic acid. Most satisfactory results are obtained on effecting the acidification by means of acetic acid, the use of which is therefore preferred. The acid treatment causes the formation of chlorin e which separates from the solution together with fatty acids, if present, and the unsaponifiable products if the hexane extraction step is omitted.

The resultant precipitate is removed, preferably by centrifugation or by a flotation procedure. The precipitate is then dried, preferably under reduced pressure to minimize decomposition, and the fatty acids and unsaponifiable materials are removed by extraction with hexane or any other suitable fat solvent.

The extracted material usually contains chlorin e of 70–80 percent purity in an amount corresponding to a yield of about 80–90 percent based on the chlorophyll present in the initial plant extract. The purity of the chlorin e thus obtained can be increased to 90–95 percent at the cost of a considerable reduction in yield by dissolving the chlorin e in a minimum amount of pyridine and precipitating it from the solution by addition of a large excess of hexane.

The following example exhibits the invention in greater detail.

*Example*

9080 g. broccoli leaf meal was exhaustively extracted in a Soxhlet apparatus with 18 liters of acetone as the chlorophyll solvent. The extract was found to contain 41.5 g. of chlorophyll. The solvent was removed by distillation first at atmospheric pressure and then in vacuo.

800 ml. of a 20 percent solution of potassium hydroxide in absolute methanol was stirred with the residue. The mixture was refluxed 1 hour, diluted with 1200 ml. water and exhaustively extracted with 3000 ml. hexane in a continuous extraction apparatus. The hexane extract so obtained was found to contain 10.0 g. phytol, 9.5 g. sterol, 3.5 g. xanthophyll and 2.2 g. carotene.

The remaining dilute methanol solution was then acidified with 180 ml. glacial acetic acid. A settling tank equipped with a bottom run-off spigot was charged with 16 liters of water slightly acidified by addition of acetic acid, and 2 liters of hexane, and the acidified solution was then poured into the tank and the contents gently mixed. On standing overnight, the precipitate consisting of a mixture of chlorin e, fatty acids and unsaponifiable material floated in the interface between the aqueous and the hexane layer. Practically all the aqueous layer was run off, and the hexane removed by decantation. The precipitate was dried in vacuo at 50°–60° C., ground to a fine powder and exhaustively extracted with hexane. The yield was 30 g. of a product containing 80 percent of chlorin e, or 87.5 percent of the theoretical.

Similar results were obtained by analogous procedures on extracting leaf meal derived from other plants such as spinach, alfalfa, and buckwheat.

A process for the preparation and separation of alkali isochlorophyllin from chlorophyll-bearing plant materials is disclosed and claimed in my copending application Serial No. 110,017, filed August 12, 1949.

I claim:

A process for the preparation of chlorin e comprising extracting a chlorophyll-bearing plant material with an organic chlorophyll solvent, removing the solvent from the extract, mixing the residue with potassium hydroxide dissolved in substantially anhydrous methanol to produce a methanol solution of potassium isochlorophyllin, diluting the solution with water, extracting the diluted solution to remove fats and unsaponifiable constituents, acidifying the extracted diluted solution with acetic acid to form and precipitate chlorin e, and removing the precipitate.

MONROE E. WALL.

REFERENCES CITED

The following references are of record in the file of this patent:

UNITED STATES PATENTS

| Number | Name | Date |
| --- | --- | --- |
| 2,274,102 | Snyder | Feb. 24, 1942 |
| 2,394,278 | Wall et al. | Feb. 5, 1946 |
| 2,428,740 | Mann | Oct. 7, 1947 |
| 2,476,358 | Diamond et al. | July 19, 1949 |

OTHER REFERENCES

Petering et al.: Ind. and Eng. Chem., vol. 33, pages 1428–1432 (1941).